United States Patent
Zurek et al.

(10) Patent No.: US 10,209,951 B2
(45) Date of Patent: Feb. 19, 2019

(54) LANGUAGE-BASED MUTING DURING MULTIUSER COMMUNICATIONS

(71) Applicant: Motorola Mobility LLC, Chicago, IL (US)

(72) Inventors: Robert Zurek, Antioch, IL (US); Amit Kumar Agrawal, Bangalore (IN); Himanshu Chug, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/478,090

(22) Filed: Apr. 3, 2017

(65) Prior Publication Data

US 2018/0285059 A1 Oct. 4, 2018

(51) Int. Cl.
| | |
|---|---|
| *G10L 15/26* | (2006.01) |
| *G10L 15/22* | (2006.01) |
| *G06F 17/00* | (2006.01) |
| *G06F 3/16* | (2006.01) |
| *H04L 29/06* | (2006.01) |
| *H04L 12/18* | (2006.01) |
| *G06F 17/28* | (2006.01) |
| *G10L 21/10* | (2013.01) |
| *G10L 21/0272* | (2013.01) |
| *G06F 17/27* | (2006.01) |
| *G10L 15/00* | (2013.01) |

(52) U.S. Cl.
CPC ............ *G06F 3/165* (2013.01); *G06F 17/275* (2013.01); *G06F 17/279* (2013.01); *G06F 17/289* (2013.01); *G10L 21/0272* (2013.01); *G10L 21/10* (2013.01); *H04L 12/18* (2013.01); *H04L 65/403* (2013.01); *G10L 15/005* (2013.01)

(58) Field of Classification Search
CPC .......... G10L 21/00; G06F 17/20; H04L 12/66
See application file for complete search history.

(56) References Cited

U.S. PATENT DOCUMENTS

| | | | | |
|---|---|---|---|---|
| 9,843,672 | B1 * | 12/2017 | Agrawal | H04M 3/42221 |
| 2008/0184284 | A1 * | 7/2008 | O'Hern | H04H 60/48 |
| | | | | 725/28 |
| 2010/0017193 | A1 * | 1/2010 | Runge | G06F 17/289 |
| | | | | 704/8 |
| 2010/0135478 | A1 * | 6/2010 | Wald | G06F 17/289 |
| | | | | 379/202.01 |

(Continued)

OTHER PUBLICATIONS

Christopher Beam, "How does interpretation work at the United Nations?", Explainer, Sep. 24, 2009, p. 1.

(Continued)

*Primary Examiner* — Shreyans A Patel
(74) *Attorney, Agent, or Firm* — Kunzler Bean & Adamson (57) ABSTRACT

Apparatuses, methods, program products, and systems are disclosed for language-based muting during multiuser communications. A method includes determining, by use of a processor, a language of speech being spoken by a user of a plurality of users communicating over a network, comparing the determined language to one or more languages that each of the plurality of users has in common, and muting the speech in response to the determined language not matching a language of the one or more languages that each of the plurality of users has in common.

20 Claims, 6 Drawing Sheets

(56) References Cited

U.S. PATENT DOCUMENTS

| | | | |
|---|---|---|---|
| 2011/0134910 A1* | 6/2011 | Chao-Suren | G06F 17/289 370/352 |
| 2014/0365966 A1* | 12/2014 | Deng | G06F 9/454 715/811 |
| 2018/0097926 A1* | 4/2018 | Osman | G06F 9/454 |

OTHER PUBLICATIONS

Skype, "How do I set up and use Skype Translator?", Skype for Windows desktop, known about as early as Nov. 14, 2016, downloaded on Jul. 3, 2017, p. 1.

Michel Galley et al., "Identifying agreement and disagreement in conversational speech: use of Bayesian networks to model pragmatic dependencies", ACL '04 Proceedings of the 42nd Annual Meeting on Association for Computational Linguistics, Article No. 669, Jul. 21-26, 2004, 8 pages.

Charles V. Wright et al., Language Identification of Encrypted VoIP Traffice: Alejandra y Roberto or Alice and Bob?, USENIX, 16th USENIX Secruity Symposium, Jul. 6, 2007, 14 pages.

Srinivas Bangalore et al., "Real-time incremental speech-to-speech translation of dialogs", ACM, NAACL HLT 12 Proceedings of the 2012 Conference of the North American Chapter of the Association for Computational Linguistics: Human Language Technologies, Jun. 3-8, 2012, pp. 437-445.

Skype, "Skype Translator", known about as early as Nov. 14, 2016, downloaded on Nov. 14, 2016, pp. 1-2.

\* cited by examiner

LANGUAGE-BASED MUTING DURING MULTIUSER COMMUNICATIONS

FIELD

The subject matter disclosed herein relates to conference communications and more particularly relates to language-based muting during a conference call.

BACKGROUND

Audio and video conferences between multiple users have become a normal part of communicating. Conferences can be virtual conferences where the participants of the conference are located at different locations and communicate using a data network. Because the participants are located in different locations, the participants may speak different native languages. Accordingly, during the conference, the participants may communicate using a common language, but hold side conversations in their native languages, which may be distracting for other participants of the conference who do not understand the language used for the side conversations.

BRIEF SUMMARY

A method for language-based muting during multiuser communications is disclosed. An apparatus and program product also perform the functions of the method. In one embodiment, a method includes determining, by use of a processor, a language of speech being spoken by a user of a plurality of users that are communicating over a network. In a further embodiment, the method includes comparing the determined language to one or more languages that each of the plurality of users has in common. In some embodiments, the method includes muting the speech in response to the determined language not matching a language of the one or more languages that each of the plurality of users has in common.

In one embodiment, muting the speech comprises preventing audio of the speech from being transmitted to one or more users of the plurality of users at an uplink device. The uplink device may be coupled to the network at a location where the user who is speaking is located. In various embodiments, muting the speech comprises preventing audio of the speech from being transmitted to one or more users of the plurality of users at a network device. The network device may be coupled to the network at a location remote to each of the plurality of users. In such an embodiment, the audio of the speech is provided to users that speak the language and are located at different locations, and the audio of the speech is not provided to users who do not speak the language of the speech.

In a further embodiment, muting the speech comprises preventing audio of the speech from being provided to one or more users of the plurality of users at a downlink device. The downlink device may be coupled to the network at a location where a user who is not speaking is located. In certain embodiments, the method further includes translating the speech from the language that is not common among each of the plurality of users to one or more languages that are spoken by one or more of the plurality of users, generating one or more audio streams of the translated speech, and transmitting the one or more generated audio stream to one or more of the plurality of users.

In one embodiment, the method includes transcribing the one or more generated audio streams into one or more transcriptions and providing a copy of the one or more transcriptions to one or more of the plurality of users that do not speak the language of the speech being spoken. In some embodiments, the method includes determining the one or more languages that each of the plurality of users has in common based on a location where each of the plurality of users is located.

In one embodiment, the method includes determining the one or more languages that each of the plurality of users has in common based on a language setting associated with each of the plurality of users. In some embodiments, the language settings for each of the plurality of users are stored at one or more of a network device located remote to each of the plurality of users, a device coupled to the network at each of the plurality of user's locations, and a cloud server.

In one embodiment, the method includes determining the one or more languages that each of the plurality of users has in common based on a white list of languages that have been designated as languages that each of the plurality of users has in common. In a further embodiment, a subset of the plurality of users are located in a common location that has a common device, and muting the speech comprises muting the speech of a user not speaking in a language that the plurality of users has in common while simultaneously allowing speech of one or more different users of the subset of users that are speaking in a language that the plurality of users has in common. In some embodiments, the method includes isolating the speech of each of the subset of users based on one or more of audio beamforming and blind source separation.

An apparatus, in one embodiment, includes a processor that performs determining a language of speech being spoken by a user of a plurality of users that are communicating over a network. In a further embodiment, the processor performs comparing the determined language to one or more languages that each of the plurality of users has in common. In some embodiments, the processor performs muting the speech in response to the determined language not matching a language of the one or more languages that each of the plurality of users has in common.

In one embodiment, muting the speech comprises preventing audio of the speech from being transmitted to one or more users of the plurality of users at an uplink device. The uplink device may be coupled to the network at a location where the user who is speaking is located. In a further embodiment, muting the speech comprises preventing audio of the speech from being transmitted to one or more users of the plurality of users at a network device. The network device may be coupled to the network at a location remote to each of the plurality of users.

In one embodiment, the audio of the speech is provided to users that speak the language and are located at different locations, and the audio of the speech is not provided to users who do not speak the language of the speech. In a further embodiment, muting the speech comprises preventing audio of the speech from being provided to one or more users of the plurality of users at a downlink device. The downlink device may be coupled to the network at a location where a user who is not speaking is located.

In one embodiment, the processor further performs translating the speech from the language that is not common among each of the plurality of users to one or more languages that are spoken by one or more of the plurality of users, generating one or more audio streams of the translated speech, transmitting the one or more generated audio streams to one or more of the plurality of users, transcribing the one or more generated audio streams into one or more transcriptions, and providing a copy of the one or more transcriptions to one or more of the plurality of users that do not speak the language of the speech being spoken.

A program product includes a computer readable storage medium that stores code executable by a processor. The executable code includes code to perform determining a language of speech being spoken by a user of a plurality of users that are communicating over a network, comparing the determined language to one or more languages that each of the plurality of users has in common, and muting the speech in response to the determined language not matching a language of the one or more languages that each of the plurality of users has in common.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
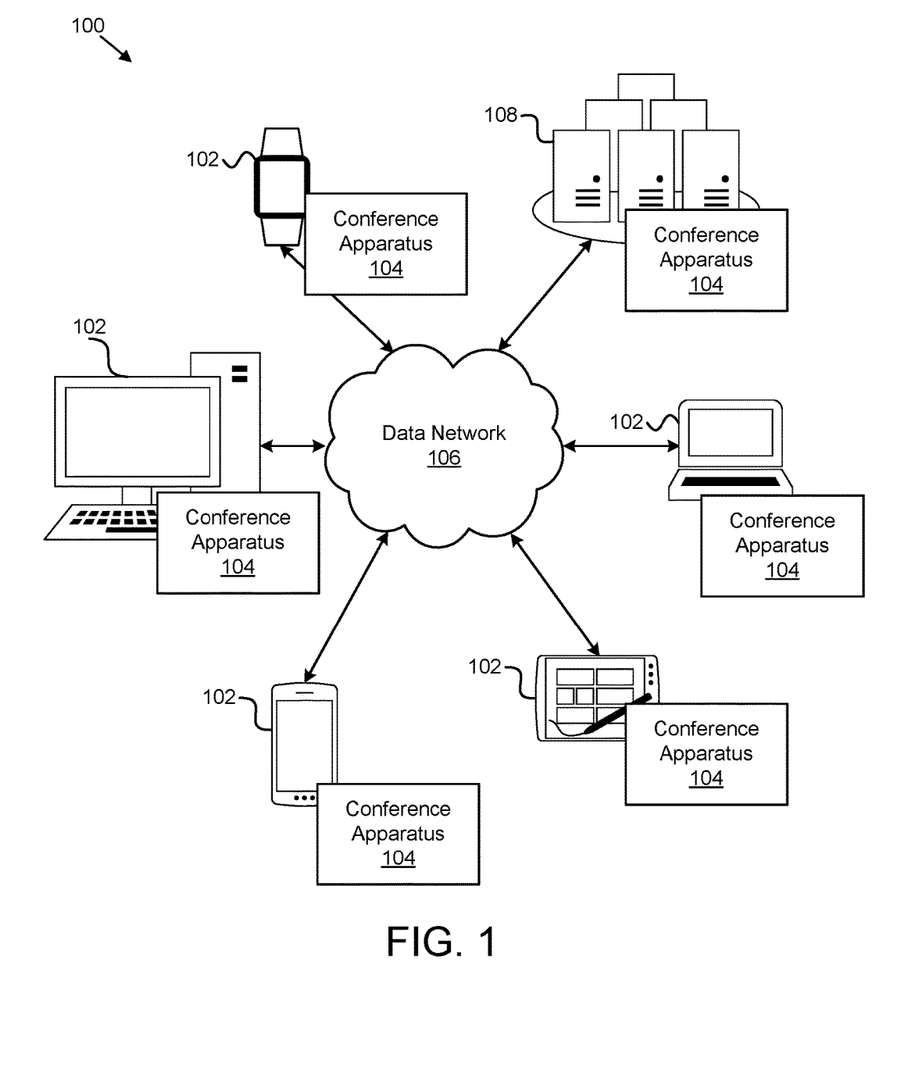
FIG. 1 is a schematic block diagram illustrating one embodiment of a system for language-based muting during multiuser communications.

FIG. 1 is a schematic block diagram illustrating one embodiment of a system 100 for language-based muting during multiuser communications. In one embodiment, the system 100 includes one or more information handling devices 102, one or more conference apparatuses 104, one or more data networks 106, and one or more servers 108. In certain embodiments, even though a specific number of information handling devices 102, conference apparatuses 104, data networks 106, and servers 108 are depicted in FIG. 1, one of skill in the art will recognize, in light of this disclosure, that any number of information handling devices 102, conference apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, are configured to execute various programs, program code, applications, instructions, functions, and/or the like, which may access, store, download, upload, and/or the like data located on one or more servers 108. The information handling devices 102 may include one or more hardware and software components for managing, initiating, and/or the like multiuser conferences such as audio and/or video conferences. Examples of various hardware components for conferencing may include microphones, speakers, cameras, and/or the like. Examples of various software components for conferencing may include Skype®, Google Hangouts®, GoToMeeting®, and/or the like.

In one embodiment, the conference apparatus 104 is configured to determine a language of speech that is being spoken by a user of a plurality of users that are communicating over a data network, e.g., during a video or audio conference call. The conference apparatus 104 further compares the determined language to one or more languages that each of the plurality of users participating in the conference have in common, and mutes the speech in response to the determined language not matching a language that each of the users has in common. In this manner, audio from side conversations that are not spoken using a common language among each of the participants can be muted so that it is not a distraction to the other participants who do not speak or understand the language.

For example, if four people are participating in a video conference, two in the United States and two in China, and the two people in China begin a side conversation in Chinese, the two people in the United States may not understand the side conversation because they do not speak or understand Chinese. In such an embodiment, the conference apparatus 104 may determine that the two people in China are speaking in Chinese, and that the two people in the United States do not speak or understand Chinese, and therefore may mute the audio of the conversation between the two people speaking Chinese so that it is not distracting to the two people in the United States. The conference apparatus 104, including its various sub-modules, may be located on one or more information handling devices 102 in the system 100, one or more servers 108, one or more network devices, and/or the like. The conference apparatus 104 is described in more detail below with reference to FIGS. 2 and 3.

In various embodiments, the conference apparatus 104 may be embodied as a hardware appliance that can be installed or deployed on an information handling device 102, on a server 108, or elsewhere on the data network 106. In certain embodiments, the conference apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the conference apparatus 104 may include a power interface, a wired and/or wireless network interface, a graphical interface that attaches to a display, and/or a semiconductor integrated circuit device as described below, configured to perform the functions described herein with regard to the conference apparatus 104.

The conference apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the conference apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the conference apparatus 104.

The semiconductor integrated circuit device or other hardware appliance of the conference apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the conference apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with conferencing, conferencing software, and the like such as user profiles, user credentials, user preferences, application settings, hardware settings, and/or the like.

Figure 2:
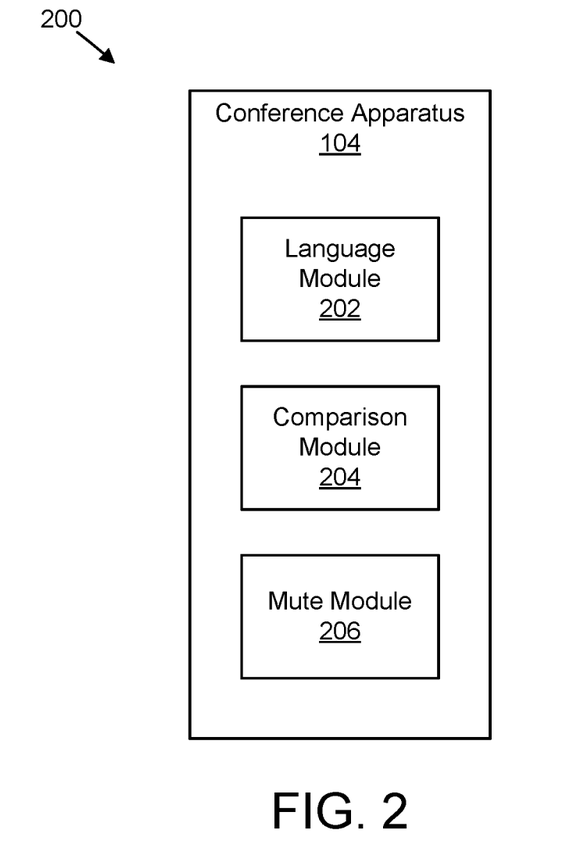
FIG. 2 is a schematic block diagram illustrating one embodiment of an apparatus for language-based muting during multiuser communications.

FIG. 2 is a schematic block diagram illustrating one embodiment of an apparatus 200 for language-based muting during multiuser communications. In one embodiment, the apparatus 200 includes an embodiment of a conference apparatus 104. The conference apparatus, in some embodiments, includes one or more of a language module 202, a comparison module 204, and a mute module 206, which are described in more detail below.

The language module 202, in one embodiment, determines a language of speech being spoken by a user of a plurality of users that are communicating over a data network 106, such as during an audio or video conference. As used herein, a conference, either audio or video, uses a set of telecommunications technologies to allow users at two or more locations to communicate using simultaneous two-way video and/or audio transmissions. In certain embodiments, in order to determine the language that a user is speaking, the language module 202 receives speech input from one or more sensors, such as a microphone that is operatively coupled to a device in a location where the user is located, e.g., a telephone, a conference phone, a computer, a smart device, or the like.

In some embodiments, the language module 202 processes the received speech input to determine which language the user is speaking. For instance, the language module 202 may execute various language identification ("LID") processes such as a parallel phonotactic language identification process ("PPLID") on the speech input to determine or detect the language that is being spoken. In certain embodiments, the language module 202 executes one or more parallel speech-to-text ("STT") instances on each user's connection or line for the conference. Each separate STT instance may perform a different language detection process or model. The output from each STT instance may be a phonetic sequence with an associated, calculated, or otherwise determined confidence factor. In certain embodiments, the STT instance with the highest confidence factor may be used to determine the language the user is speaking. In some embodiments, the number of STT instances, language models, and/or languages are limited to the languages that are spoken by the users on a particular connection and/or a particular location.

In some embodiments, the comparison module 204 compares the determined language of the speech to one or more languages that each of the plurality of users has in common. In other words, the comparison module 204 determines whether the detected language matches a language that each of the plurality of users in the conference speaks or understands. In certain embodiments, each of the users are associated with one or more languages that they can speak or understand. In some embodiments, the one or more languages that each user speaks or understands may be determined based on an input provided by each user, based on the location where each user is located, and/or the like, as described below in reference to the common language module 308.

The mute module 206, in one embodiment, mutes, automatically and in real-time, the speech of the user that is speaking in response to the determined language not matching a language of the one or more languages that each of the plurality of users has in common. For instance, if the detected language is French and the comparison module 204 determines that French is not spoken by each user in the conference, the mute module 206 may mute the user so that the audio of the user's speech is not transmitted to other users in the conference.

In one embodiment, the mute module 206 mutes the user's speech by preventing audio of the speech, at an uplink device, from being transmitted to one or more users of the plurality of users using downlink devices. As used herein, an uplink device is a device that is coupled to the network at a location where the user who is speaking is located. For example, the uplink device may include a smart phone, a conference phone, or the like, that is physically located at the same location as the user who is speaking. Similarly, a downlink device is a device that is coupled to the network at a location where a user who is not speaking is located. In certain embodiments, a device may be both an uplink and downlink device depending on the manner in which it is being used. For instance, when the device is capturing speech audio and transmitting the audio to other devices it is acting as an uplink device, and when the device is receiving speech audio and providing the speech audio to one or more users it is acting as a downlink device.

Thus, the mute module 206, for example, in response to the comparison module 204 determining that the language being spoken is not a common language, may mute the microphone on the uplink device, may prevent or block an audio signal of the user's speech from being transmitted to downlink devices at different locations where other users are located, and/or the like. In such an embodiment, the mute module 206 may only transmit speech that is spoken in a language that is common to all participants in the conference. In other words the mute module 206, when running locally on the uplink device, acts as an automated language dependent uplink mute to ensure that no other users or participants hear local conversations that are held in a language that is not common to, or spoken by, other participants in the conference.

In some embodiments, the mute module 206 mutes the user's speech by preventing audio of the speech, at a downlink device, from being provided to or received by one or more users of the plurality of users using downlink devices. In such an embodiment, an audio stream of the user's speech is sent to each downlink device, and the language module 202 may run parallel STT instances on the audio steam to determine the language that is being spoken. Accordingly, if the comparison module 204 determines that the language being spoken is not a common language, the mute module 206 may mute, reduce the volume of, or turn off the speakers of the downlink device; may prevent the received speech audio signal from being transmitted to the speakers or sound processor of the downlink device; and/or the like. In such an embodiment, users may select which languages they would like to filter-out and/or which languages they want to allow to be heard.

In one embodiment, the mute module 206 mutes the user's speech by preventing audio of the speech, at a network device, from being transmitted to one or more users of the plurality of users using downlink devices. As used herein, a network device may be a device that is connected to the network 106, but located remote to each user of the plurality of users. In such an embodiment, the network device may coordinate, manage, maintain, and/or the like communications between the plurality of the users participating in the conference. Thus, for example, in response to the comparison module 204 determining that the language being spoken is not a common language, the mute module 206 may prevent the received speech audio from being transmitted to downlink devices where users are located that do not speak or understand the determined language.

In a further embodiment, the mute module 206 at the network device may selectively mute the speech audio for particular downlink devices that are located where users who do not speak or understand the determined language of the detected speech. In other words, the mute module 206 may transmit, provide, or the like the audio of the speech to downlink devices that are associated with users who do speak or understand the determined language, and prevent the audio of the speech from being transmitted to downlink devices associated with users who do not speak or understand the determined language. For example, a conference call may involve Spanish speakers in Spain, Spanish speakers in the Unites States, and Chinese speakers in China, where the common language among all the speakers is English. When the speakers in the United States speak to each other in Spanish, the mute module 206 located at the network device may prevent the Spanish dialogue from being transmitted to the downlink device associated with the Chinese speakers, but may allow the transmission of the Spanish dialogue to be transmitted to the Spanish speakers in Spain because they also speak Spanish and can understand what is being said so that it is not a distraction for them.

In one embodiment, the mute module 206 may selectively mute particular users at a location where a plurality of users are located in response to the particular users not speaking in a language that is common to each user in the conference. In other words, instead of the mute module 206 muting the entire room, for example, by muting the microphone of an uplink device when a single user is detected to be speaking in a language that is not common among all the participants in the conference, the mute module 206 may track each user at the location and only mute the audio stream for a particular user when that user is speaking in a language that is not common among all the participants in the conference. In this manner, the rest of the users may continue to participate in the conference (e.g., in a language that is common among all users in the conference), while muting audio from a subset of the plurality of users who may be speaking in a language that is not common among the users in the conference.

In one embodiment, the mute module 206 isolates or detects the speech of each of the user at a location using an audio directional signal processing method, such as beamforming, blind source separation, and/or the like. As used herein, beamforming is a signal processing technique used in sensor arrays for directional signal transmission or reception. For instance, the mute module 206 may process data signals received at a sensor, a sensor array, or the like at an uplink device to detect sound signals generated by the users at a location and associate particular sound signals with particular users at the location. Similarly, blind source separation is the separation of a set of source signals from a set of mixed signals, without the aid of information (or with very little information) about the source signals or the mixing process. For example, the mute module 206 may use blind source separation at an uplink device to separate a set of user's voices within a room from a set of mixed audio signals generated by the users. In this manner, the mute module 206 can identify particular users within a single location, such as users in the same room, and selectively mute audio streams associated with each user when the users do not speak or understand in a language that is common among each of the users in the conference.

Figure 3:
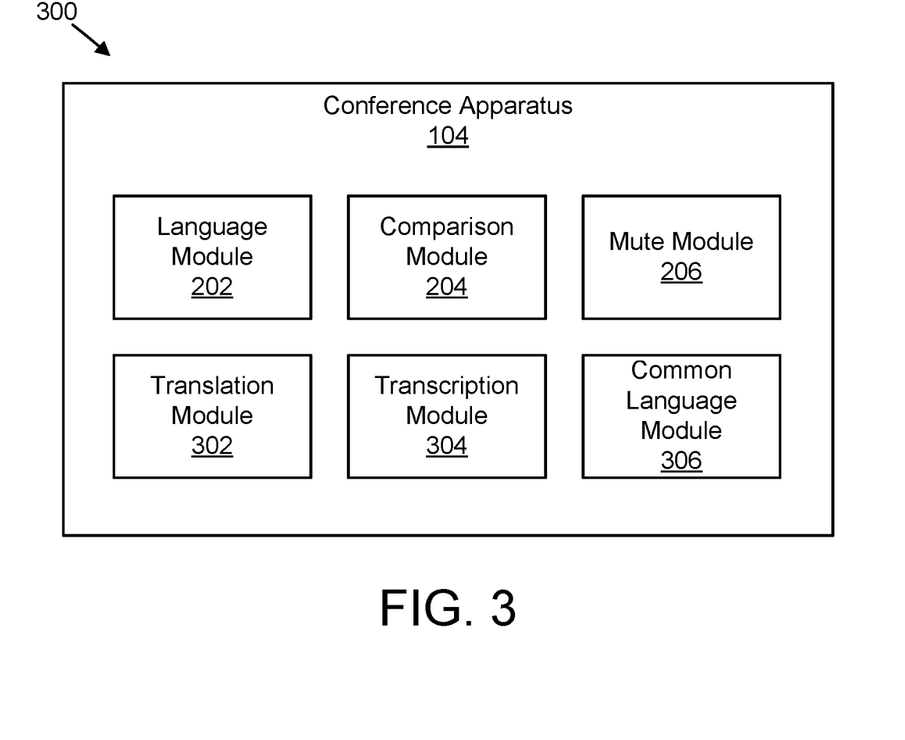
FIG. 3 is a schematic block diagram illustrating one embodiment of another apparatus for language-based muting during multiuser communications.

FIG. 3 is a schematic block diagram illustrating one embodiment of another apparatus 300 for language-based muting during multiuser communications. In one embodiment, the apparatus 300 includes an instance of a conference apparatus 104. The conference apparatus 104, in certain embodiments, includes a language module 202, a comparison module 204, and a mute module 206, which may be substantially similar to the language module 202, the comparison module 204, and the mute module 206 described above with reference to FIG. 2. In a further embodiment, the conference apparatus 104 includes one or more of a translation module 302, a transcription module 304, and a common language module 306, which are described in more detail below.

The translation module 302, in one embodiment, translates a user's speech from a language that is not common among each of the plurality of users in the conference to one or more languages that are spoken by one or more of the plurality of users in the conference. For example, the translation module 302 may process an audio stream of a user speaking Chinese and translate the user's dialogue from Chinese to French for a user located in France who does not speak Chinese. In certain embodiments, the translation module 302 generates one or more audio streams of the translated speech, and transmits the one or more generated audio streams to one or more of the plurality of users who speak or understand the languages that the speech was translated into. For example, the translation module 302 (or the transcription module 304 described below) may first transcribe the user's speech to text and then perform a text-to-speech analysis on the transcribed speech to generate the one or more audio streams of the translated text. The translation module 302 may reside on an uplink device, a downlink device, and/or a network device.

The transcription module 304, in one embodiment, transcribes the one or more generated audio streams of the translated audio into one or more textual transcriptions, and provides or sends a copy of the one or more transcriptions to the users who need a translation of the speech, e.g., the users who do not speak or understand the language of the speech. The transcription module 304 may provide the transcribed speech to users in real-time, e.g., on a display of the downlink device, or via a text, an email, or an instant message, and/or the like. The transcription module 304 may reside on an uplink device, a downlink device, and/or a network device.

In various embodiments, the language module 202 may determine whether a user who is speaking has a heavy, strong, unusual, or otherwise difficult to understand accent or dialect, even if the user is speaking in the language that is common among all the participants of the conference. For instance, the language module 202 may determine whether the user's speech meets an accent or dialect threshold associated with a number of words, phrases, sounds, sentences, or the like that the language module 202 cannot understand or determine. If so, the translation module 302 may generate a translation of the speech, e.g., a more accurate translation of the speech, and the transcription module 304 may generate a textual transcription of the speech so that other users can better understand what the user is saying.

In various embodiments, the common language module 306 determines which languages are common among the users in the conference. In one embodiment, the common language module 306 determines the common language(s) based on the locations where each of the users is located. The location for each user may be determined based on location services, an IP or other network address, a profile, account, or setting for each user in the conference, and/or the like. In some embodiments, the common language module 306 determines a native language of a user based on a location where the user is located.

For example, if the user is located in India, the common language module 306 may determine that the user's native language is Hindi; if the user is located in Germany, the common language module 306 may determine that the user's native language is German; and so on. The common language module 306, in some embodiments determines the native according to the official language of the country, state, city, or the like where the user is located. For example, the common language module 306 may check government websites, regulations, laws, or the like to determine the official language of the country where the user is located. The common language module 306 may then determine which languages, if any, the users have in common based on the location of the users.

In one embodiment, the common language module 306 determines the common languages for the users in the conference based on a language setting associated with each user. For instance, at the beginning of the conference, each user may specify which language(s) they speak or understand. In another example, the common language module 306 may check a profile or a user account for each user to determine whether the profile or account includes information regarding which languages the user speaks or understands. A user, for instance, may set up a user account and may specify during the account set up which languages he speaks or understands. In certain embodiments, the language setting, e.g., the user account or user profile, may be stored and accessed from a network device that is located remotely from each of the plurality of users, a device coupled to the network at each of the user's locations (e.g., an uplink and/or downlink device), a cloud server, and/or the like.

In some embodiments, the common language module 306 determines one or more languages that a particular user speaks or understands based on a white list of languages that have been designated as languages that each of the plurality of users has in common. For example, the white list may be generated or accessed at the beginning of a conference based on the users' input (e.g., the users may each specify which languages they speak or understand at the beginning of the conference), based on the users' locations, based on the users' profiles or preferences, and/or the like. The common language module 306 may then create or generate the white list of languages that are common based on the various inputs, and store the white list in an accessible location, such as on a network device, a cloud server, and/or on each uplink or downlink device at the users' locations. Based on the whitelist, the mute module 206 may mute any speech that is spoken in a language that is not found on the white list.

Figure 4:
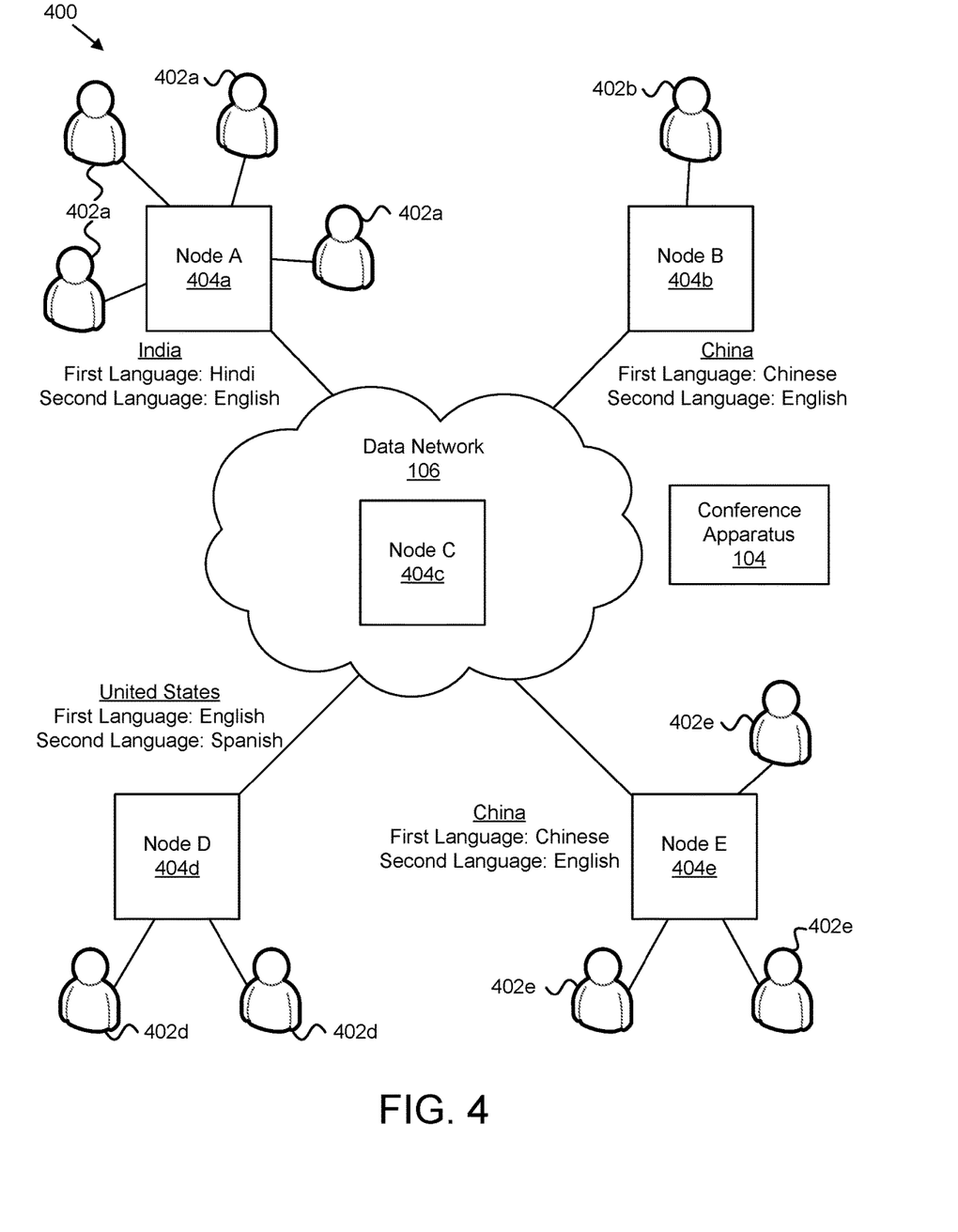
FIG. 4 is a schematic block diagram illustrating an example embodiment of a system for language-based muting during multiuser communications.

FIG. 4 is a schematic block diagram illustrating an example embodiment of a system 400 for language-based muting during multiuser communications. In one embodiment, the system 400 includes four participants 402a at a location in India, a participant 402b at a location in China, two users 402d at a location in the United States, and three users 402e at a different location in China.

In one embodiment, the common language module 306 determines the languages that each of the users 402 speak or understand, and further determines which languages are common among each of the users 402. For example, the common language module 306 may determine that the users 402a in India speak Hindi first and English second; that the user 402b in China speaks Chinese first and English second; that the users 402d in the United States speak English first and Spanish second; and that the other users 402e in China speak Chinese first and English second. The common language module 306 may make this determination based on the users' 402 locations, language preferences, language settings, profiles, user accounts, language input, and/or the like. Thus, in the example embodiment depicted in FIG. 4, the common language module 306 may determine that English is the language that each of the users has in common. The common language module 306 may also generate a white list of common languages that the various devices 404a-e may access in order to make the determination whether a spoken language is a common language among all the users 402a-e in the conference.

In one embodiment, while the conference is ongoing, the language module 202 determines a language of speech of a user who is currently speaking. For instance, the language module 202 may receive an audio stream of the user's speech and use one or more language identification processes, described above, to determine the language that the user is speaking. The comparison module 204 may then determine whether the determined language matches a language that each user in the conference has in common. If not, then the mute module 206 mutes the speech, or an audio stream of the speech, so that the other users cannot hear the user's speech.

For example, if a user 402e in China speaks to the other users 402a-e in the conference in English, as determined by the language module 202, the mute module 206 will not mute the user's 402e speech because it is spoken in a language that all the users 402a-e have in common. However, if the user 402e in China begins speaking to his colleagues in China in Chinese, as determined by the language module 202, the mute module 206 may mute the user's 402e speech because Chinese is not a language that is spoken by all of the users 402a-e in the conference, as determined by the comparison module 204.

Continuing with the previous example, the mute module 206 may mute the user's 402e speech at the uplink device 404e located where the Chinese 402e users are located. In such an embodiment, the mute module 206 acts a filter at the uplink device such that any languages that are spoken at the location in China that are not a common language among the plurality of users 402a-e, as determined by the comparison module 204 will be muted such that the audio of the speech is prevented from being transmitted to the devices 404a-d of the other users 402a-d.

In another example, the mute module 206 may mute the user's 402e speech at each downlink device 404a-d. In such an embodiment, the mute module 206 acts as a filter at each downlink device 404a-d based on an analysis by the language module 202 and the comparison module 204 of the received audio stream of the speech, and makes a determination at the downlink device 404a-d whether to mute or allow the speech to be provided to the users 402a-d.

In a further example, the mute module 206 may mute the user's 402e speech at a network device 404c. For instance, the audio stream of the user's 402e speech may be sent from the uplink device 404e to the network device 404c, where the speech is then analyzed to determine the language of the speech and whether the determined language is a common language among the users 402a-e in the conference. In such an embodiment, the language module 202 may determine the language of the speech, e.g., Chinese, and the comparison module 204 may compare the determined language to one or more languages that are common among the users in the conference, e.g., English. If the determined language is not a common language, then the mute module 206 may prevent the speech from being transmitted to the downlink devices 404a-d at the other locations. In a further embodiment, however, the mute module 206 may determine that Chinese is spoken by a user 402b at a different location, e.g., by another user 402b in China, and may transmit the audio of the speech to the user 402b.

In certain embodiments, the translation module 302 and/or the transcription module 304 may be used to translate and/or transcribe the speech that is spoken in a language that is not common among the users 402a-e so that each user can hear and/or read a translation of the dialogue. In such an embodiment, the translation and/or transcription may be performed on an uplink device, and then sent to the downlink devices; on each downlink device, which may allow users 402a-e to select or choose whether to translate and/or transcribe the speech; and/or at the network device 404c.

Figure 5:
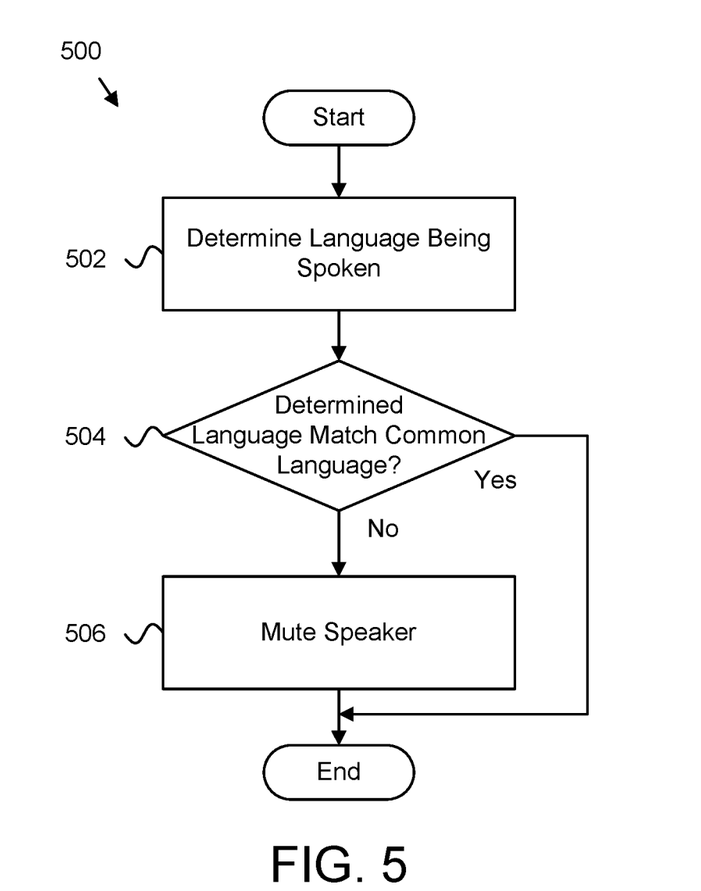
FIG. 5 is a schematic flow chart diagram illustrating one embodiment of a method for language-based muting during multiuser communications.

FIG. 5 is a schematic flow chart diagram illustrating one embodiment of a method 500 for language-based muting during multiuser communications. In one embodiment, the method 500 begins and determines 502 a language of speech being spoken by a user of a plurality of users that are communicating over a network. In some embodiments, the method 500 determines 504 whether the determined language matches one or more languages that each of the plurality of users has in common. If the method 500 determines 504 that the determined language matches a language that is common among all the users in the conference, then the method 500 ends. Otherwise, the method 500 mutes 506 the speech of user so that the other users that do not have that language in common cannot hear the speech, and the method 500 ends. In certain embodiments, the language module 202, the comparison module 204, and/or the mute module 206 perform the various steps of the method 500.

Figure 6:
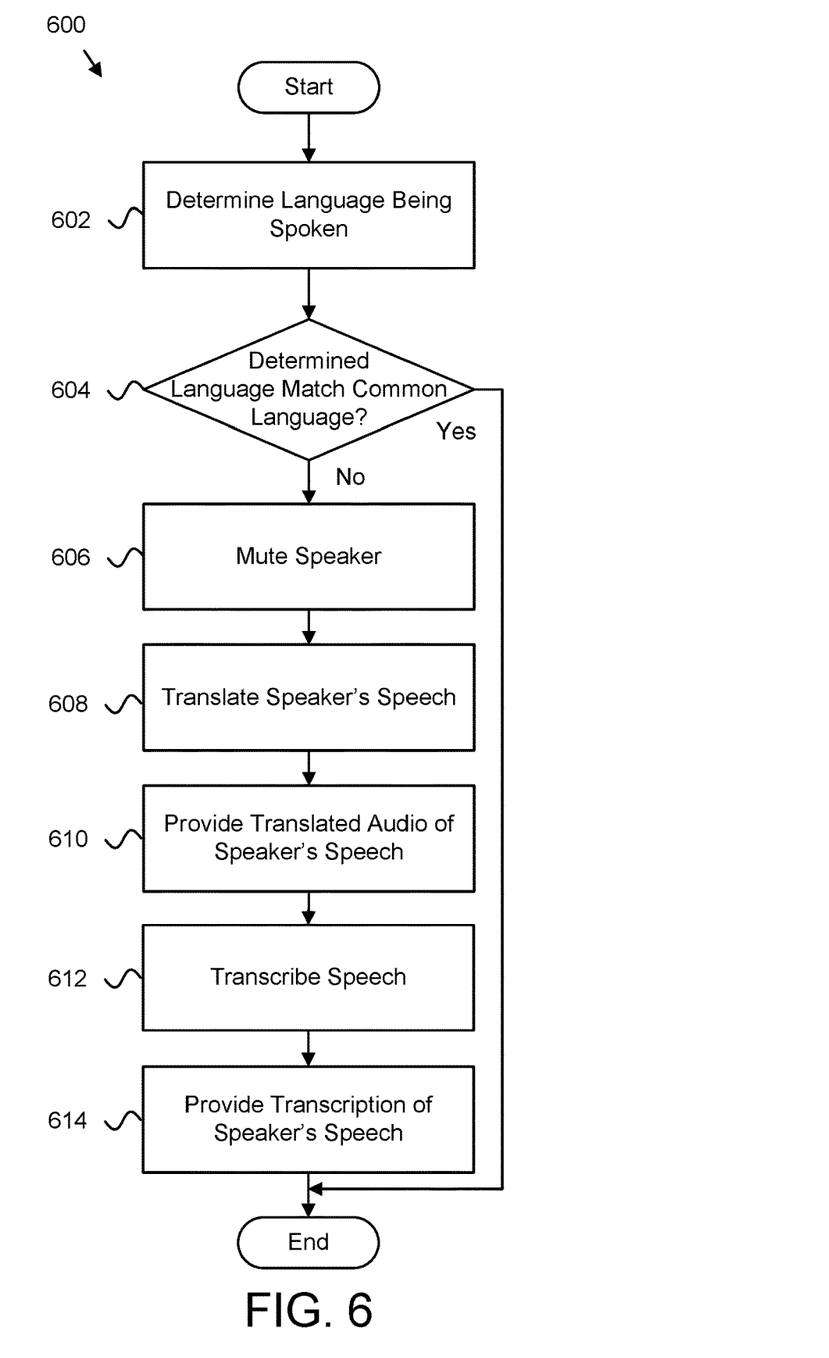
FIG. 6 is a schematic flow chart diagram illustrating one embodiment of another method for language-based muting during multiuser communications.

FIG. 6 is a schematic flow chart diagram illustrating one embodiment of another method 600 for language-based muting during multiuser communications. In one embodiment, the method 600 begins and determines 602 a language of speech being spoken by a user of a plurality of users that are communicating over a network. For example, the method 600 may perform one or more language identification processes to determine the language the user is speaking.

In some embodiments, the method 600 determines 604 whether the determined language matches one or more languages that each of the plurality of users has in common. The method 600, for instance, may determine 604 languages that the users may have in common based on the locations of the users, a language setting or preference provided by the users, a user profile or account, a whitelist of designated common languages, and/or the like.

If the method 600 determines 604 that the determined language matches a language that is common among all the users in the conference, then the method 600 ends. Otherwise, the method 600 mutes 606 the speech of user so that the other users that do not have that language in common cannot hear the speech. The method 600, for instance, may mute 606 the user's speech at an uplink device where the user is located by preventing the audio stream of the speech from being transmitted to downlink devices; at downlink devices where the other users are located by preventing the received audio stream from being processed, by muting the volume, or the like; at a network device by preventing the audio stream of the speech from being transmitted to downlink devices; and/or any combination of the foregoing.

In a further embodiment, the method 600 translates 608 the user's speech to one or more languages that other users can understand. The method 600 may provide 610 a translated audio stream of the user's speech to the other users who do not speak or understand the same language as the current user who is speaking. The method 600, in various embodiments, transcribes 612 the user's speech and/or the translated form of the user's speech, and provides 614 the transcription to the other users. For example, the method 600 may electronically send the transcription to downlink devices via text, email, instant message, or other electronic message means for display on a display device, and the method 600 ends. In certain embodiments, the language module 202, the comparison module 204, the mute module 206, the translation module 302, the transcription module 304, and/or the common language module 306 perform the various steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   determining, by use of a processor, a language of speech being spoken by a user of a plurality of users, the plurality of users communicating over a network;
   determining one or more languages that each of the plurality of users has in common, a common language for each of the plurality of users comprising a language that each of the plurality of users understands;
   comparing the determined language to the determined one or more languages that each of the plurality of users has in common; and
   muting the speech in response to the determined language not matching a language of the one or more languages that each of the plurality of users has in common.

2. The method of claim 1, wherein muting the speech comprises preventing audio of the speech from being transmitted to one or more users of the plurality of users at an uplink device, the uplink device coupled to the network at a location where the user who is speaking is located.

3. The method of claim 1, wherein muting the speech comprises preventing audio of the speech from being transmitted to one or more users of the plurality of users at a network device, the network device coupled to the network at a location remote to each of the plurality of users.

4. The method of claim 3, wherein the audio of the speech is provided to users that speak the language and are located at different locations, and wherein the audio of the speech is not provided to users who do not speak the language of the speech.

5. The method of claim 1, wherein muting the speech comprises preventing audio of the speech from being provided to one or more users of the plurality of users at a downlink device, the downlink device coupled to the network at a location where a user who is not speaking is located.

6. The method of claim 1, further comprising:
translating the speech from the language that is not common among each of the plurality of users to one or more languages that are spoken by one or more of the plurality of users;
generating one or more audio streams of the translated speech; and
transmitting the one or more generated audio stream to one or more of the plurality of users.

7. The method of claim 6, further comprising:
transcribing the one or more generated audio streams into one or more transcriptions; and
providing a copy of the one or more transcriptions to one or more of the plurality of users that do not speak the language of the speech being spoken.

8. The method of claim 1, further comprising determining the one or more languages that each of the plurality of users has in common based on a location where each of the plurality of users is located.

9. The method of claim 1, further comprising determining the one or more languages that each of the plurality of users has in common based on a language setting associated with each of the plurality of users.

10. The method of claim 9, wherein the language settings for each of the plurality of users are stored at one or more of a network device located remote to each of the plurality of users, a device coupled to the network at each of the plurality of user's locations, and a cloud server.

11. The method of claim 1, further comprising determining the one or more languages that each of the plurality of users has in common based on a white list of languages that have been designated as languages that each of the plurality of users has in common.

12. The method of claim 1, wherein a subset of the plurality of users are located in a common location that has a common device, and wherein muting the speech comprises muting the speech of a user not speaking in a language that the plurality of users has in common while simultaneously allowing speech of one or more different users of the subset of users that are speaking in a language that the plurality of users has in common.

13. The method of claim 12, further comprising isolating the speech of each of the subset of users based on one or more of audio beamforming and blind source separation.

14. An apparatus comprising:
a processor performing:
determining a language of speech being spoken by a user of a plurality of users, the plurality of users communicating over a network;
determining one or more languages that each of the plurality of users has in common, a common language for each of the plurality of users comprising a language that each of the plurality of users understands;
comparing the determined language to the determined one or more languages that each of the plurality of users has in common; and
muting the speech in response to the determined language not matching a language of the one or more languages that each of the plurality of users has in common.

15. The apparatus of claim 14, wherein muting the speech comprises preventing audio of the speech from being transmitted to one or more users of the plurality of users at an uplink device, the uplink device coupled to the network at a location where the user who is speaking is located.

16. The apparatus of claim 14, wherein muting the speech comprises preventing audio of the speech from being transmitted to one or more users of the plurality of users at a network device, the network device coupled to the network at a location remote to each of the plurality of users.

17. The apparatus of claim 16, wherein the audio of the speech is provided to users that speak the language and are located at different locations, and wherein the audio of the speech is not provided to users who do not speak the language of the speech.

18. The apparatus of claim 14, wherein muting the speech comprises preventing audio of the speech from being provided to one or more users of the plurality of users at a downlink device, the downlink device coupled to the network at a location where a user who is not speaking is located.

19. The apparatus of claim 14, wherein the processor further performs:
translating the speech from the language that is not common among each of the plurality of users to one or more languages that are spoken by one or more of the plurality of users;
generating one or more audio streams of the translated speech;
transmitting the one or more generated audio stream to one or more of the plurality of users;
transcribing the one or more generated audio streams into one or more transcriptions; and
providing a copy of the one or more transcriptions to one or more of the plurality of users that do not speak the language of the speech being spoken.

20. A program product comprising a computer readable storage medium that stores code executable by a processor, the executable code comprising code to perform:
determining a language of speech being spoken by a user of a plurality of users, the plurality of users communicating over a network;
determining one or more languages that each of the plurality of users has in common, a common language for each of the plurality of users comprising a language that each of the plurality of users understands;
comparing the determined language to the determined one or more languages that each of the plurality of users has in common; and
muting the speech in response to the determined language not matching a language of the one or more languages that each of the plurality of users has in common.

* * * * *